Sept. 24, 1968    W. F. JACKSON    3,402,886
THERMOSTATIC CONTROL DEVICE WITH HIGH LIMIT SWITCH
Filed April 28, 1966

INVENTOR
WILBUR F. JACKSON

BY Anthony A. O'Brien

ATTORNEY

United States Patent Office 3,402,886
Patented Sept. 24, 1968

3,402,886
THERMOSTATIC CONTROL DEVICE WITH HIGH LIMIT SWITCH
Wilbur F. Jackson, Rolling Hills, Calif., assignor to Robertshaw Controls Company, Richmond, Va., a corporation of Delaware
Filed Apr. 28, 1966, Ser. No. 545,992
3 Claims. (Cl. 236—21)

ABSTRACT OF THE DISCLOSURE

A dual thermostatic control device with a normal temperature sensor housing an abnormal temperature sensor. The normal temperature sensor includes an outer tube of thermally expandable material and an inner tube of thermally non-expandable material with adjacent ends of such tubes being joined so that the inner tube moves axially in response to thermal expansion and contraction of the outer tube. The abnormal temperature sensor includes a bimetal switch disposed in the inner tube and being actuated in response to an abnormal temperature condition.

---

Figure 1:
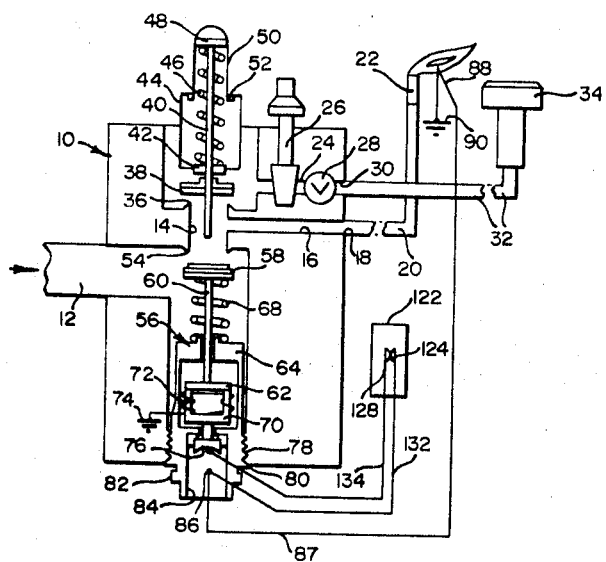

The present invention relates to a thermostatic control device and, in particular, to such a control device embodying a high limit switch.

In modern heating appliances, such as domestic hot water heaters, it is standard practice to control a supply of fuel to a main burner and to a pilot burner, with the main burner flow being thermostatically controlled within a normal operating range and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube thermostat.

With the above arrangement, failure of the thermostatic valve means for any reason could result in tank explosions from dangerously high temperatures in the hot water tank. Accordingly, it is desirable to provide the control system with a high limit cut off feature responding to abnormal temperature conditions in the water tank. The high limit cut off feature is associated with the thermoelectric safety device, which thus requires reset in response to two separate conditions, one being the extinguishment of the flame at the pilot burner and the other being the occurrence of an abnormal temperature condition.

An object of the present invention is to house a high limit switch in a thermally non-responsive element of a tubular thermostat unit.

It is another object of the present invention to form a thermostat unit from a pair of tubular members of different thermally responsive materials with a high limit switch disposed in one of the tubular members.

The present invention has a further object in that a pair of tubular members of different thermally responsive material are concentrically assembled on a control device casing to respond to normal temperature conditions and a bimetal switch is disposed in the innermost tubular member to respond to abnormal temperature conditions.

In accordance with the present invention, a thermoelectric control device includes a casing having inlet and outlet means with a flow passage therebetween, control means in the flow passage, thermoelectric means including safety shut-off means in the passage, and electromagnetic means energized for holding the safety shut-off means in an open position, thermoelectric circuit means for energizing the electromagnetic means, temperature sensor means carried by the casing adapted to move the control means in response to normal temperature conditions and including a pair of concentrically arranged inner and outer tubular members of different thermally respective materials joined at one of their adjacent ends to define a thermostat unit, and bi-metal switch means in the inner tubular member being electrically connected in the circuit means for deenergizing the electromagnetic means in response to abnormal temperature conditions.

Figure 2:
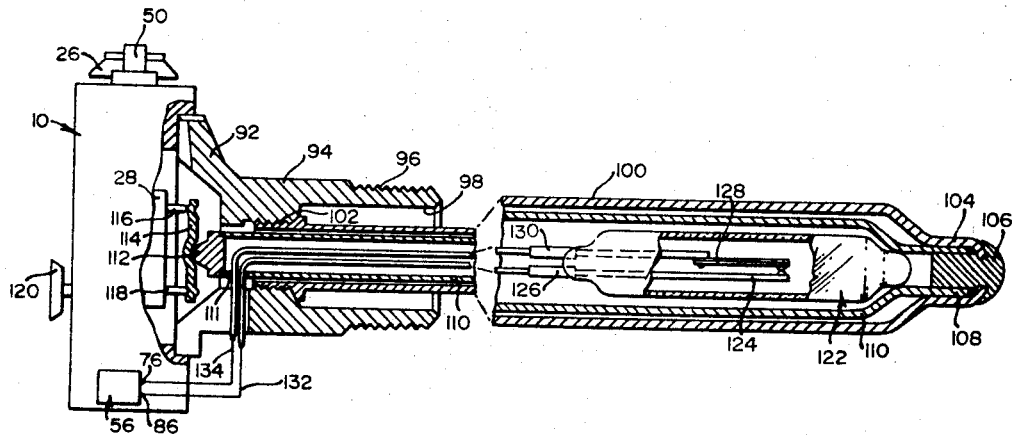

Other objects and advantages of the present invention will become apparent from the following description of a preferred embodiment, taken in connection with the accompanying drawing wherein:

FIG. 1 is a schematic diagram of a fuel burner control system embodying the present invention; and FIG. 2 is a schematic diagram of the control device of FIG. 1 with parts broken away and parts in section.

While the present invention may be applicable to various types of control devices and various types of heating appliances and may be utilized in connection with electrical heating elements as well as gaseous fuel burning heater elements, it will be described in connection with a fuel burner control system for a hot water heater.

As is illustrated in FIG. 1, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 that is controlled by a manually operable on-off valve 26 and a thermostatically operated valve 28, which valves are upstream of a main flow outlet port 30 that communicates with a conduit 32 for supplying fuel to a main burner 34.

The pilot flow passage 16 communicates with the common passage 14 intermediate its opposite ends which define upstream and downstream valve seats. The downstream valve seat 36 is controlled by combined reset and valve means which includes a valve member 38 carried adjacent one end of a reset stem 40. The upper end of the stem 40 extends through a sealing collar 42 on a plunger housing 44 in which a coil spring 46 encircles the stem 40 and is mounted in compression between the collar 42 and a disc 48 on the end of the stem 40. The stem 40 is retained in the housing 44 by means of a hollow push button 50 which receives the stem disc 48 and which includes an annular bottom flange 52 engaging the housing wall surrounding an opening therefor.

The upstream valve seat 54 is controlled by an electromagnetic device, indicated generally at 56, having a safety shut-off valve member 58 movably disposed for cooperation with the valve seat 54. The valve member 58 is fixed to one end of an armature stem 60 which has its other end fixed to an armature 62 located in a fixed magnet housing 64 so that the stem 60 is slidably disposed relative to the housing 64. A coil spring 68 surrounds one end of the armature stem 60 and is mounted in compression between the top end wall of the magnet housing 64 and the rear surface of the valve member 58 which is thus biased to a closed position against the valve seat 54. The valve member 58, stem 60 and armature 62 reciprocate as a unit between released and attracted positions relative to fixed electromagnetic means in the form of a generally U-shaped magnet core 70 and an electric coil 72 wound thereon. One end of electric coil 72 is connected to a ground terminal 74 and the other end is connected to an electrical conductor 76.

As is shown in FIG. 1, the bottom end wall of the magnet housing 64 is defined by support means in the form of a magnet base 78 having external threads so that the entire assembly 56 may be threaded into a suitable opening in the casing 10. In order to prevent any fuel leakage from such opening, the threads are provided with a sealing compound and a tapered sealing lip 80 on the periphery of the magnet base 78 which has a seal tight relationship with the periphery of such opening.

The conductor 76 extends through the top portion of the base 78 and has a concave surface disposed in the upper part of a cavity formed in the bottom portion of the base 78. A hexagonal periphery 82 on the exterior of the base bottom portion receives a wrench or tool for tightening the assembly 56 in the threaded opening of the casing 10. The bottom of base 78 has a threaded opening 84 which receives a thermocouple cable connector (not shown) having a conductor 86; a thermocouple lead 87 from one side of a thermocouple 88 extends to such conductor 86 while the other side of the thermocouple 88 is connected to a ground terminal 90. The thermocouple 88 is mounted in the proximity of the pilot burner 22 so as to be heated from the flame thereof.

As is illustrated in FIG. 2, the thermostatic means for the control device is carried by the casing 10 and a flanged portion 92 of a mounting shank 94 attached to the rear wall of casing 10 as by cap screws (not shown). The free end of mounting shank 94 includes external threads 96 for threading the assembly through the wall of a hot water tank (not shown) and a stepped internal recess 98 that is coextensive with the tube 100 of a thermostatic unit; with such an arrangement, substantially the entire length of the tube 100 is disposed in the hot water resulting in a more accurate and faster response of the thermostatic unit. The inner end of shank recess 98 is threaded to receive the threaded end 102 of the tube 100 which is made of thermally responsive material, such as drawn copper.

The free end of tube 100 has a terminus 104 of reduced cross-section which is closed by an end plug 106. The cross-sectionally reduced end 108 of an inner tube 110 is disposed between the inner wall of terminus 104 and the end plug 106; the end plug 106 thus seals the tube ends 104 and 108 and the entire end assembly is integrated into a unitary closed end as by soldering, brazing, welding or the like. Since the inner tube 110 is made of thermally non-responsive material, such as "Invar," and since the inner tube 110 and outer tube 100 are joined at their adjacent ends, they define a thermostat unit.

The other end of inner tube 110 projects through the end 102 of the outer tube 100 and is provided with a slot or opening 111 in its cylindrical wall adjacent its end which is closed by a plug member 112. A rounded projection on the plug member 112 engages an intermediate recess in an operating lever 114; a projection on end of lever 114 engages the actuating rod 116 of the thermostatically operated valve 28 while an indentation on the other end of lever 114 receives the end of an adjusting shaft 118 which is axially movable by means of a temperature setting dial 120. With such an arrangement, it is now apparent that rotation of the dial 120 through a selective range of temperature settings will change the relative position of the operating lever 114 whereby the temperature at which the valve 28 is actuated, will be determined by the adjusted position of the lever 114.

A bimetal switch, indicated generally at 122, is mounted in the forward end of the inner tube 110. The casing of the switch 122 may be of any suitable dielectric material, such as ceramic or glass, and includes a fixed contact arm 124 having a sealed-in terminal 126 and a bimetal contact arm 128 having a sealed-in terminal 130. The sealed-in terminals 126 and 130 are connected to lead wires 132 and 134, respectively, that are threaded through the inner tube opening 111 and are connected to conductors 86 and 76, respectively. Thus, the conductor 86 defines a common junction whereby the bimetal switch 122 is electrically connected in series with the thermocouple lead 87 of the thermoelectric circuit. The switch 122 is calibrated to respond to a predetermined abnormal temperature condition and thus defines a limit switch operable at a higher temperature than that of the normal temperature responsive thermostatic valve 28.

The particular sequence of operation of the above circuitry will be described in detail in connection with the following description of the overall operation of the control device. To place the system of FIG. 1 in operation, the manual valve 26 is rotated to an on position and temperature setting dial 120 for the thermostatically operated valve is moved to a selected temperature, e.g., 140° F. for conventional domestic hot water heaters. The reset button 50 is manually depressed whereby the valve member 38 is closed on valve seat 36 to prevent any fuel flow through the main flow passage 24 during lighting and whereby the lower end of the reset stem 40 moves the valve member 58, stem 60 and armature 62 as a unit against the bias of coil spring 68 to an attracted or valve open position permitting a fuel flow through the pilot flow passage 16 to the pilot burner 22 where it is ignited as by a match. As soon as the thermocouple 88 is heated sufficiently by the pilot burner flame to energize the holding electromagnetic means, core 70 and coil 72, the push button may be released whereupon the armature 62 is held in its attracted position and both valve seats 36 and 54 are open. Inasmuch as the thermostatically operated valve 28 is open, fuel flows to the main burner 34 which is ignited by the flame of the pilot burner 22.

When the water temperature reaches the selected temperature, the valve 28 is closed and the main fuel flow is cut off and the main burner 34 is extinguished. A subsequent decrease in the water temperature, as when the hot water is drawn off and replenished with cold water, causes the valve 28 to be opened again. During normal operation the main burner 34 will be cycled thermostatically as outlined above to maintain the water temperature at 140° F. The thermostatic operation of the valve 28 is accomplished by the thermostat unit comprising the inner and outer tubes 100 and 110. Upon increasing temperatures, the outer copper tube 100 expands axially and moves to the right as viewed in FIG. 2; the inner "Invar" tube 110 does not expand with temperature increases but is also moved to the right because the connected ends 104 and 108 assure that the inner tube 110 will follow the movement of the outer tube 100. Similarly, upon decreasing temperatures, the outer copper tube 100 contracts axially and the inner tube 110 is moved to the left as viewed in FIG. 2.

Should the flame at the pilot burner 22 be extinguished from any cause, the thermocouple 88 will cool and the thermoelectric current to the magnet coil 72 will cease; thereupon the armature 62 will be released from the magnet core 46 under the bias of the coil spring 68, which closes the valve member 58 on the valve seat 54 to effect 100% shut off of all fuel flow. In order to place the system in operation again, the resetting procedure outlined above must be repeated.

In accordance with the present invention, the thermostatic device is integrally provided with a separate thermally responsive switch 122 to prevent excessively high water temperatures, e.g., in the range of 190° F. due to some malfunction which keeps the main burner 34 in operation. At 190° F., the high limit switch 122 is opened and the thermoelectric circuit is broken whereby the magnet coil 72 is deenergized and the armature 62 is released to effect 100% shut off of fuel flow as described above. As soon as the temperature decreases to its normal operating range, the bimetal arm 128 closes the high limit switch 122, however, to commence operation of the system, the resetting procedure must be repeated as outlined above.

Inasmuch as the present invention is subject to many other modifications, variations and changes in detail, it is intended that all matter contained in the foregoing description or shown in the accompanying drawing shall be interpreted as illustrative and not in a limiting sense.

What is claimed is:

1. A dual temperature responsive device comprising first temperature sensing means including an outer tube of thermally expandable, heat conductive material and an inner tube of thermally non-expandable material longitudinally disposed in said outer tube in spaced relation thereto, said outer tube having one closed end and fastening means on an opposite end adapted for attaching the device to a support, said inner tube having one end secured to the closed end of said outer tube whereby said inner tube is moved longitudinally in response to thermal expansion and contraction of said outer tube, said inner tube having an opposite end adapted to actuate a control element, and second temperature sensing means including bimetal switch adapted to actuate another control element, said bimetal switch being disposed in said inner tube for operation in response to abnormal temperature conditions.

2. The invention as recited in claim 1 wherein said bimetal switch is disposed in an end portion of said inner tube defined by the said one end thereof.

3. The invention as recited in claim 2 wherein said inner tube has opening means adjacent the said opposite end thereof and said bimetal switch has lead wires extending through said opening means for connection to said another control element.

References Cited

UNITED STATES PATENTS

| | | | |
|---|---|---|---|
| 1,082,131 | 12/1913 | Meacham | 236—102 X |
| 1,851,657 | 3/1932 | Appleberg | 200—138.6 |
| 2,089,663 | 8/1937 | Richeson | 236—102 X |
| 2,192,960 | 3/1940 | Bokovoy | 200—138.6 |
| 3,291,390 | 12/1966 | Solomon | 236—21 |
| 3,320,388 | 5/1967 | Kreuter | 236—21 X |

EDWARD J. MICHAEL, *Primary Examiner.*